May 5, 1970          D. E. HANNUM          3,510,069
WATER FLOW AND GARBAGE DISPOSAL CONTROL SYSTEM
Filed May 8, 1968          2 Sheets-Sheet 1
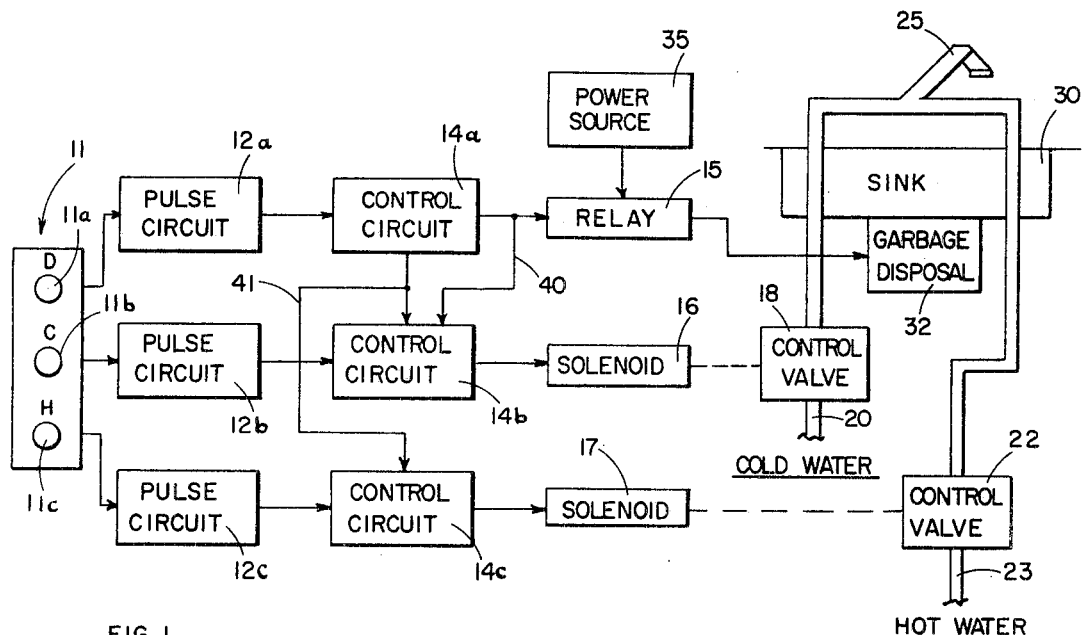
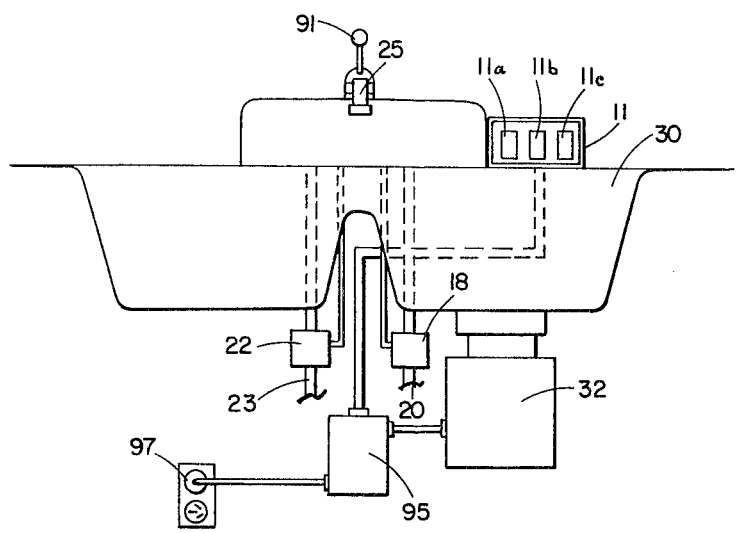
INVENTOR.
DONALD E. HANNUM
BY
SOKOLSKI & WOHLGEMUTH
ATTORNEYS United States Patent Office 3,510,069
Patented May 5, 1970

3,510,069
WATER FLOW AND GARBAGE DISPOSAL
CONTROL SYSTEM
Donald E. Hannum, Palos Verdes Estates, Calif., assignor to Crosby Research, Inc., Los Angeles, Calif., a corporation of California
Filed May 8, 1968, Ser. No. 727,445
Int. Cl. B02c 18/42
U.S. Cl. 241—33
6 Claims

ABSTRACT OF THE DISCLOSURE

A solenoid valve is placed in the hot and cold water lines of a sink and a relay is used to control the power to a garbage disposal installed in such sink. Separate pushbutton switches are provided for each of the water controls and the garbage disposal. A control circuit comprising a flipflop operating in conjunction with a silicon controlled rectifier is provided to control each of the solenoid valves and the garbage disposal relay, each of said circuits being activated and deactivated in response to momentary actuations of the associated pushbutton switch. The control circuit for the disposal is interlocked with the control circuits for the water valves such that the cold water is automatically turned on and kept on whenever the disposal is operative and the hot water is automatically turned off under such conditions and cannot be turned on during disposal operation.

Figure 2:
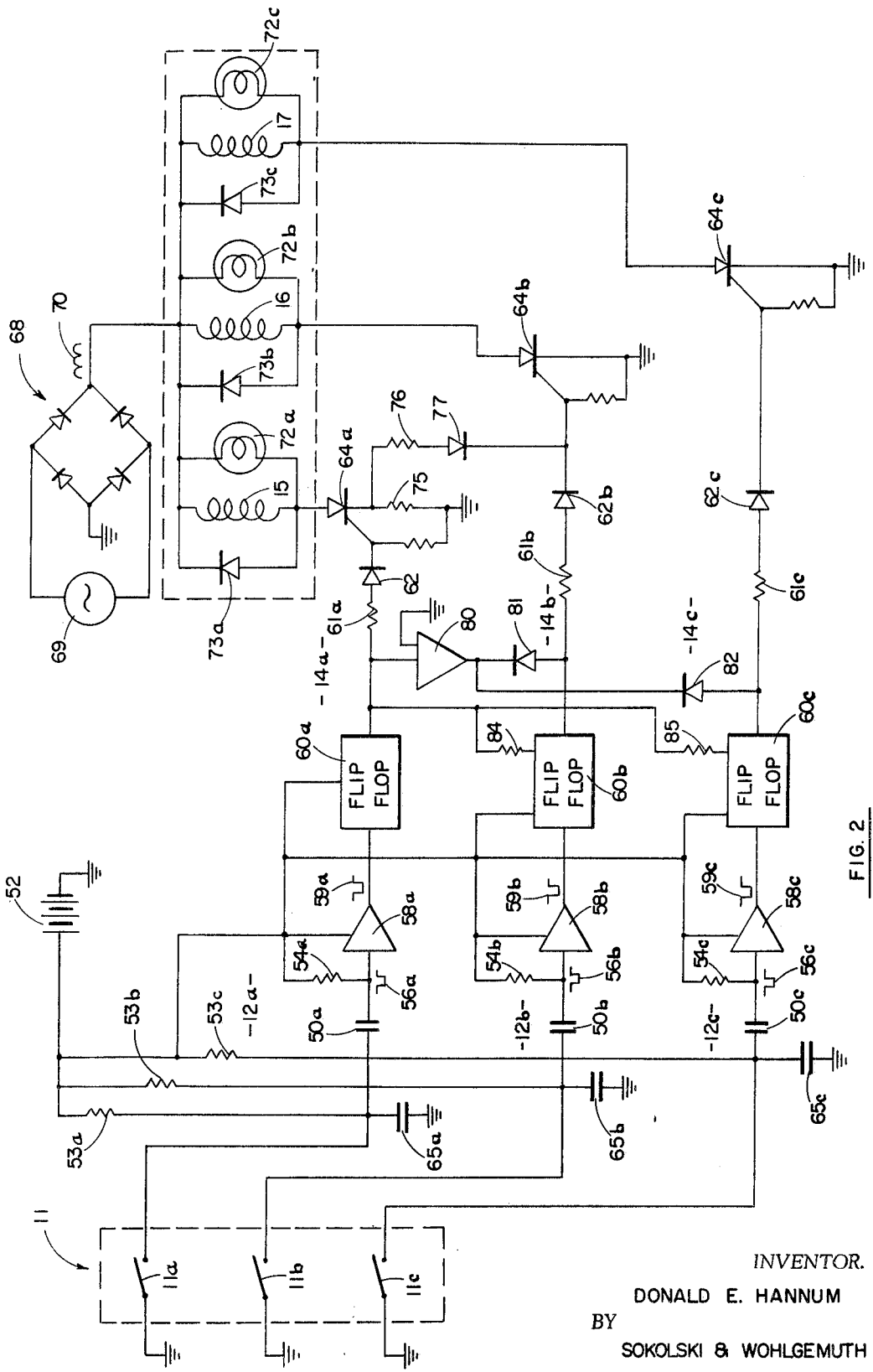

This invention relates to a control system for controlling the water flow to a sink and the operation of a garbage disposal installed in such sink, and more particularly to such a system utilizing an electronic control circuit.

In the prior art, a control device is described in which electrical pushbuttons are utilized to control the hot and cold water controls and the operation of a garbage disposal. This type of system has many advantages over the conventional faucet control systems in providing convenience of operation and control. In the aforementioned system, the control for the garbage disposal is interconnected with the cold water control so that the cold water always goes on when the disposal is operated. The system, however, is incapable of assuring that cold water cannot be turned off again and that the hot water is off during such times and always disabled from operation during disposal operation. This provides the obvious disadvantage of possibility of warm or hot water being fed through the disposal during its operation which is highly undesirable in that without the proper cooling such blades tend to overheat and wear out rapidly. Further, the control circuitry of this prior art utilizes relatively bulky components and is not of as economical construction as would be desired. Also, the circuitry of this prior art has certain shortcomings in its reliability of operation.

The system of this invention provides an improvement over that described in the prior art by utilizing solid state circuitry which has accurate, high-reliability characteristics. Further, the control circuitry of the device of the invention is highly compact and of economical construction and further is capable of providing additional control functions not present in the prior art device.

Briefly, the system of the invention comprises an electrical pushbutton control switch for each of the hot and cold water and garbage disposal control circuits. The control circuits for each of these functions are closely similar to each other and each include a capacitive pulse circuit for developing a control pulse each time the associated pushbutton is momentarily actuated. Each of the control pulses is utilized to drive a separate flipflop which in turn actuates an electronic power control switch which may comprise a silicon controlled rectifier. These silicon controlled rectifiers are utilized to actuate the hot water solenoid valve, the cold water solenoid valve, and the disposal control relay, respectively. Successive actuations of any of the pushbutton control switches alternately switch the associated flipflops to opposite states and thus activate and deactivate the associated silicon controlled rectifiers accordingly. Interconnections are provided between the garbage disposal control circuit and the hot and cold water control circuits to cause activation of the cold water silicon controlled rectifier whenever the disposal is operating, and to disable the control of the cold water and hot water circuits by their associated pushbutton switches during disposal operation.

The device of the invention will now be described in connection with the drawings of which:

FIG. 1 is a block diagram illustrating the basic operation of the system of the invention, FIG. 2 is a functional schematic drawing illustrating a preferred embodiment of the control circuit of the invention, and FIG. 3 is a drawing illustrating a typical installation of the system of the invention.

Referring now to FIG. 1, a block diagram illustrating the general operation of the system of the invention is shown. Pushbutton control box 11 has electrical pushbuttons 11a, 11b, and 11c mounted therein for actuating the garbage disposal, cold water, and hot water, respectively. Pushbuttons 11a, 11b and 11c may be any type of electrical switch which provides a momentary electrical contact when it is actuated and released, in the fashion, for example, of a typical door bell button. Each of pushbuttons 11a, 11b and 11c is connected to an associated pulse circuit, 12a–12c. Pulse circuits 12a–12c, as to be described fully in connection with FIG. 2, each comprise a capacitive charging circuit whereby a current path for such circuit is completed when the pushbutton is actuated, thereby resulting in the generation of a control pulse. The pulse outputs of pulse circuits 12a–12c are fed to associated control circuits 14a–14c respectively. The control circuits 14a–14c may include flipflops which change state in response to each succeeding pulse. The control circuits also include electronic power switches which are capable of providing a control current for an associated relay or solenoid. Control circuit 14a is utilized to control relay 15, while control circuits 14b and 14c are utilized to control solenoids 16 and 17 respectively.

Solenoid 16 controls the operation of control valve 18 which is in cold water line 20, while solenoid 17 controls the operation of control valve 22, which is in hot water line 23. When control valve 18 is actuated in response to solenoid 16, cold water is passed through to spigot 25 mounted in sink 30, while control valve 22 feeds hot water to spigot 25 in response to solenoid 17. Garbage disposal 32, which is mounted in sink 30, is operated by means of power supplied by power source 35, such power being fed to activate the disposal through relay 15 and only at such times when this relay is actuated in response to control circuit 14a. Control circuit 14a is interlocked with control circuits 14b and 14c such that when control circuit 14a is activated, i.e., when the disposal is being operated, a control signal is fed on line 40 to control circuit 14b to cause this circuit to be activated whenever the disposal is operating, thus assuring a flow of cold water at such times automatically. Interconections are also provided from control circuit 14a to control circuit 14b and control circuit 14c to disable the operation of there circuits in response to their pushbuttons 11b and 11c respectively, thus preventing the cold water from being turned off in response to an actuation of pushbutton 11b and preventing the hot water from being turned on in response to an actuation of pushbutton 11c.

The control system would typically be operated as follows: A momentary actuation of pushbutton 11c results in the generation of a control pulse by pulse circuit 12c and this pulse activates control circuit 14c. This results in the actuation of solenoid 17 which operates control valve 22 thereby causing a flow of hot water to spigot 25. A succeeding actuation of pushbutton 11c results as before in the generation of a pulse by pulse circuit 12c. This pulse operates to cause the flip-flop of control circuit 14c to go to the opposite state, thereby causing the deactuating of solenoid 17 thereby shutting off control valve 22. Let us assume that with the hot water turned on it is desired to operate the disposal. All that need be done to effect this operation is to momentarily depress pushbutton 11a. Under such circumstances with the generation of a pulse by pulse circuit 12a control circuit 14a is actuated thereby actuating relay 15 and connecting power from power source 35 to disposal 32. At the same time, a signal is fed on line 40 to actuate control circuit 14b to cause the cold water to go on. Also, a signal is simultaneously fed on line 41 to control circuits 14b and 14c, signal to control circuit 14c disabling the operation of this circuit in response to hot water pushbutton 11c and changing the conduction state of the associated flip-flop to cause control valve 22 to turn off the hot water. The signal to control circuit 14b prevents the operation of this circuit in response to a succeeding actuation of pushbutton 11b, which otherwise would turn the cold water off.

Referring now to FIG. 2, a schematic drawing of a preferred embodiment of the device of the invention is shown. Pushbutton switch 11c has one of its terminals connected to ground, the other of the terminals of this switch being connected to one side of capacitor 50c. With switch 11c not actuated (as indicated in the drawing), capacitor 50c has one side thereof connected to the positive terminal of power source 52 through resistor 53c and the other end thereof connected to the positive terminal of power source 52 through resistor 54c. Under such conditions, the capacitor will remain in its uncharged condition. When switch 11c is momentarily closed however in the actuation of the hot water flow, one side of capacitor 50c is grounded and the other side, which is still connected the capacitor will remain in its unchanged condition. When switch 1c is momentarily closed however in the actuation of the hot water flow, one side of capacitor 50c is grounded and the other side, which is still connected through resistor 54c to power source 52, completes a charge path for the capacitor, causing current to flow thereto through resistor 54c. This current flow results in a negative pulse 56c appearing at the input to amplifier 58c. Pulse 56c is amplified by amplifier 58c which has as its output an amplified negative going pulse 59c. Pulse 59c is utilized as the input drive to flip-flop 60c and drives this flip-flop to an opposite state of conduction from that previously had. In the particular case illustrated, this brings the flip-flop stage connected through resistor 61c to diode 62c to the nonconductive state thereby providing a positive signal through diode 62c to the control gate of silicon controlled rectifier 64c.

Silicon controlled rectifier 64c has its anode connected through solenoid coil 17 to the output of bridge rectifier 68. Bridge rectifier 68 rectified the AC output of AC power source 69 and provides a pulsating DC voltage 70 as its output. By virtue of the positive voltage established at the gate electrode of silicon controlled rectifier 64c by the output of flip-flop 60c, the rectifier will be driven to conduction in response to each wave, going to cutoff in response to the nodes of the pulsating voltage. This will result in an average DC current through solenoid coil 66, which is sufficient to actuate the solenoid and hold it in its actuated state whereby it holds the hot water valve open, permitting the passage of hot water. The use of this pulsating voltage is significant in that it serves to bring the silicon controlled rectifier to cutoff when the firing voltage at its control electrode disappears with the next momentary actuation of switch 11c to cause flip-flop 60 to go to the opposite state. Capacitor 65c and resistor 53c form a filter which filters out noise generated by the switch to avoid spurious responses to such noise.

The cold water solenoid 16 operates in the same manner as described for the hot water solenoid in response to momentary actuations of cold water switch 11b, the various corresponding components having the same numerals as corresponding parts of the circuit for the hot water control but with the letter b added thereto. So, similarly, switch 11a controls the garbage disposal control relay 15 with like components again having the same numerals affixed thereto, but in this instance with the letter a added. An indicator lamp 72a–72c is placed in parallel with coils 15–17 respectively, to provide an indication of the actuation thereof. Diodes 73a–73c are connected across coils 15–17 respectively to short circuit the back EMF's generated by the collapsing magnetic fields in each coil as the associated silicon controlled rectifier pulse goes to zero. This assures that the rectifiers go to cutoff in each cycle, and prevents damage to the rectifiers.

As already noted, the control circuitry for the disposal has additional control functions for controlling the hot and cold water circuits when the disposal circuit is activated. This additional circuitry will now be described. Silicon controlled rectifier 64a has a resistor 75 between its cathode element and ground. When the disposal relay 15 is actuated in response to the conduction of silicon controlled rectifier 64a, a positive voltage is developed across resistor 75, this voltage being coupled through resistor 76 and diode 77 to the control gate of silicon controlled rectifier 64b. This positive voltage causes silicon controller rectifier 64b to fire during the pulsating cycles 70 thereby actuating solenoid coil 16. In this manner, the cold water is turned on and kept on whenever the disposal is operating, regardless of the condition of flip-flop 60b.

Also, when the output of flipflop 60a is such as to provide a firing signal to the control gate of silicon controlled rectifier 64a, this high level signal is inverted in amplifier 80 and is essentially at ground potential. This signal applied to the output of the flipflops 60b and 60c always causes those flipflops to go to a state whereby those grounded outputs go low and remain low as long as they are essentially at ground potential. In this manner, the outputs of flipflops 60b and 60c are disabled so that they can have no effect on the operation of their associated silicon controlled rectifiers so that any actuations of switches 11b and 11c which might cause the cold water to go off and/or the hot water to go on will have no effect.

It is to be noted along these lines that the signal coupled through diode 81 to the output of flipflop 60b does not affect the firing action of the signal coupled to the control gate of silicon controlled rectifier 60b through diode 77 but rather operates solely to neurtalize any effect on the operation that the output of flipflop 60b might have by effectively providing a grounding signal on the output of the flipflop through diode 81 and amplifier 80 when the output of flipflop 60a is high.

Signals are also provided from the output of flipflop 60a when such output is in its high condition through resistors 84 and 85 to flipflops 60b and 60c respectively. These signals are fed to the control elements of appropriate stages of the flipflops and assist in their turnoff action.

Referring now to FIG. 3, a typical installation of the device of the invention is shown. Garbage disposal 32 is mounted under sink 30 in normal fashion. Control box 95 contains the control relay for the disposal and serves as a connection box for the pushbutton control circuit power. A spigot 25 is mounted on the sink and the volume of water thereto is controlled by means of valve control 91. Pushbutton control switches 11a, 11b and 11c for the garbage disposal and hot and cold water are mounted in control box 11, which also contains the control circuitry. Power is provided for the various units from power outlet 97.

I claim:

1. A system for controlling hot and cold water flow and a garbage disposal comprising:

a pushbutton switch for each of said hot water, cold water and garbage disposal control, pulse circuit means for generating a control pulse in response to the actuation of each of said pushbutton switches, control circuit means including a flipflop control circuit for each of said pulse circuit means for providing a control signal in response thereto, said flipflop control circuits changing state in response to each successive pulse output of the associated pulse circuit means, a control valve interposed in each of said hot and cold water lines for controlling the flow of water therein, solenoid means for controlling each of said control valves, said solenoid means each being responsive to a separate one of said flipflop control circuits, a power source, relay means for connecting said power source to said garbage disposal to energize said disposal, said relay means operating in response to an associated one of said control circuit means, first circuit means interconnecting said garbage disposal flipflop control circuit with said cold water control circuit means to cause said cold water control valve to be actuated whenever said garbage disposal is operated, and second control circuit means interconnecting said disposal flipflop control circuit means with said cold and hot water flipflop control circuits to disable the operation of said flipflop control circuits in response to the cold and hot pushbuttons when said garbage disposal is operating.

2. The system as recited in claim 1 wherein said pulse circuit means comprises a DC power source and a capacitive charging circuit connected between said power source and each of said pushbutton switches, said switches when actuated completing the circuit path for said charging circuits.

3. The system as recited in claim 1 and additionally including a silicon controlled rectifier interposed between each of said flipflop control circuits and said solenoid and relay means, each of said silicon controlled rectifiers being activated in response to one of said flipflop control circuits.

4. The system as recited in claim 3 and including a source of pulsating DC voltage for providing power to energize said solenoid means and said relay means, said silicon controlled rectifiers each being connected in series with said source of pulsating voltage and one of said solenoid and relay means whereby said rectifiers are deactivated in response to the nodes of said pulsating voltage.

5. The circuit is recited in claim 3 wherein said first circuit control means interconnecting said garbage disposal flipflop control circuit with said cold water control circuit comprises a resistor in series with the silicon controlled rectifier associated with said disposal flipflop control circuit and means for coupling the voltage across said resistor to the silicon controlled rectifier associated with said cold water control circuit means.

6. The circuit as recited in claim 1 wherein said second control circuit means comprises a separate resistor interconnecting the output of the flipflop control circuit associated with said disposal to a control electrode of each of the other of said flipflop control circuits and an inverting amplifier interconnecting said disposal flipflop control circuit output with the outputs of each of the other of said flipflop control circuits.

References Cited

UNITED STATES PATENTS 3,374,957    3/1968    Tyler _____ 241—33

JAMES M. MEISTER, Primary Examiner

U.S. Cl. X.R.

241—46